United States Patent [19]

Cook et al.

[11] 4,272,688

[45] Jun. 9, 1981

[54] STRIP BREAK DETECTOR SYSTEM

[75] Inventors: John W. Cook, Williamsville; Voit C. Drankhan, Boston, both of N.Y.

[73] Assignee: Westinghouse Electric Corp., Pittsburgh, Pa.

[21] Appl. No.: 54,516

[22] Filed: Jul. 3, 1979

[51] Int. Cl.³ .................. B65H 25/30; B65H 25/32
[52] U.S. Cl. ................................ 307/123; 242/57; 226/10; 307/152; 340/675
[58] Field of Search ................. 307/121, 152, 123; 340/675, 676, 677, 669, 670; 226/10, 11; 242/75.51, 57, 36, 38, 42

[56] References Cited

U.S. PATENT DOCUMENTS

| | | | |
|---|---|---|---|
| 3,429,491 | 2/1969 | Windley | 226/11 |
| 3,558,069 | 1/1971 | Feder | 242/36 |
| 3,863,241 | 1/1975 | Kamiyamaguchi et al. | 226/11 X |
| 4,070,562 | 1/1978 | Kuno et al. | 340/669 X |

*Primary Examiner*—L. T. Hix
*Assistant Examiner*—James L. Dwyer

[57] ABSTRACT

A strip break detection system is disclosed for a process line in which strip material is being payed out from a payoff reel to a rewind reel. The system is digital, and is based on the concept that for normal mill operation, with continuous strip being payed out from a payoff reel to a rewind reel, equal increments of rotation of the rewind reel, results in ever increasing increments of rotation of the payoff reel. A payoff counter is coupled to the payoff reel. The break detection system is controlled from a rewind counter coupled to the rewind reel which triggers a sequence controller for comparing the successive counts in the payoff counter to ensure that they are ever increasing under normal processing conditions, if the comparison indicates the converse an alarm is sounded; however, since there may be transient and self correcting conditions in the process line during which the latter count of the payoff counter may be less, the system is desensitized by further comparison with a dead band count. If the comparison of the sequential counts in the payoff counter produces a difference which is equal to or greater than the dead band, an alarm signal then indicates that a break has occurred.

7 Claims, 2 Drawing Figures

000
STRIP BREAK DETECTOR SYSTEM

BACKGROUND OF THE INVENTION

1. Field of the Invention

This invention relates to a break detection system for a processing line in which strip material is being payed out from a payoff reel to a rewind reel.

2. Description of the Prior Art

In the continuous processing of materials, it is imperative that the operator know as quickly as possible when a break occurs in the material. This is demanded in some industrial applications because a break may cause damage to the processing equipment per se, but even where this is not the case, it is still important to know when a break occurs in order to mitigate the economic losses occurred by prolonged down time.

In the processing of strand material, U.S. Pat. No. 3,429,491 to Windley for "Break Detector and Shut Down Means", Windley detects the breakage of one or more filaments by reason of the fact that there is a loss in tension in the filaments which is a function of the power output of the take up or pulling motor. The decrease in motor power is sensed by a Hall effect device which operates through various relay contacts to shut down the power to the pay out motor.

U.S. Pat. No. 3,863,241 to Kamiyamaguchi et al. entitled "Yarn Break Detector Utilizing a Sensor for Sensing the Yarn Static Electricity" utilizes a collecting electrode in contact with the moving yarn to detect the static electricity generated by the moving material, and positive pulses are continuously generated. When the yarn is broken, the charges disappear, and negative pulses are generated which are then processed to produce the alarm pulse signal.

In the processing of metals, the techniques have been somewhat different. One analog approach which has been used is to compare the entry strip speed with the delivery strip speed by utilizing the entry and delivery billy roll speeds as modified for the nominal mill draft. These analog systems have never proven to be fully reliable because of changes in draft during rolling, as well as the slippage of the billy rolls in contact with the moving material.

The systems presently in use for strip break detection permit a reel device to go into speed limit and then detect when that limit has been reached. In a processing line tension is placed on the material by the combined effect of the rewind reel pulling in one direction and the payoff reel yieldingly pulling in the opposite direction. When a break occurs, the rewind reel continues to pull in the same direction but the payoff reel, now experiencing no opposing pull, winds in the opposite direction so that speed limit for the payoff reel occurs at essentially zero speed. This scheme is reliable but it requires too long for the reels to attain speed limit.

SUMMARY OF THE INVENTION

A break detection system for a process line is claimed wherein strip material is being payed out from a payoff reel to a rewind reel. Means are provided for successively digitally counting the material being played out from the payoff reel, over first and second equal digital sampling intervals, these sampling intervals being a function of the rotational displacement of the rewind reel. Additional means memorize the successive digital counts to provide first and second memory counts respectively. Further, means subtract the first memory counts from the second memory counts to produce a difference signal delta. Finally, means provide a signal indicative that a break in the strip material has occurred when delta is equal to or greater than a preselected dead band count.

DESCRIPTION OF THE PREFERRED EMBODIMENT

The invention will be described in the environment of a single stand mill, although the teachings are equally applicable to a multi-stand tandem mill.

Figure 1:
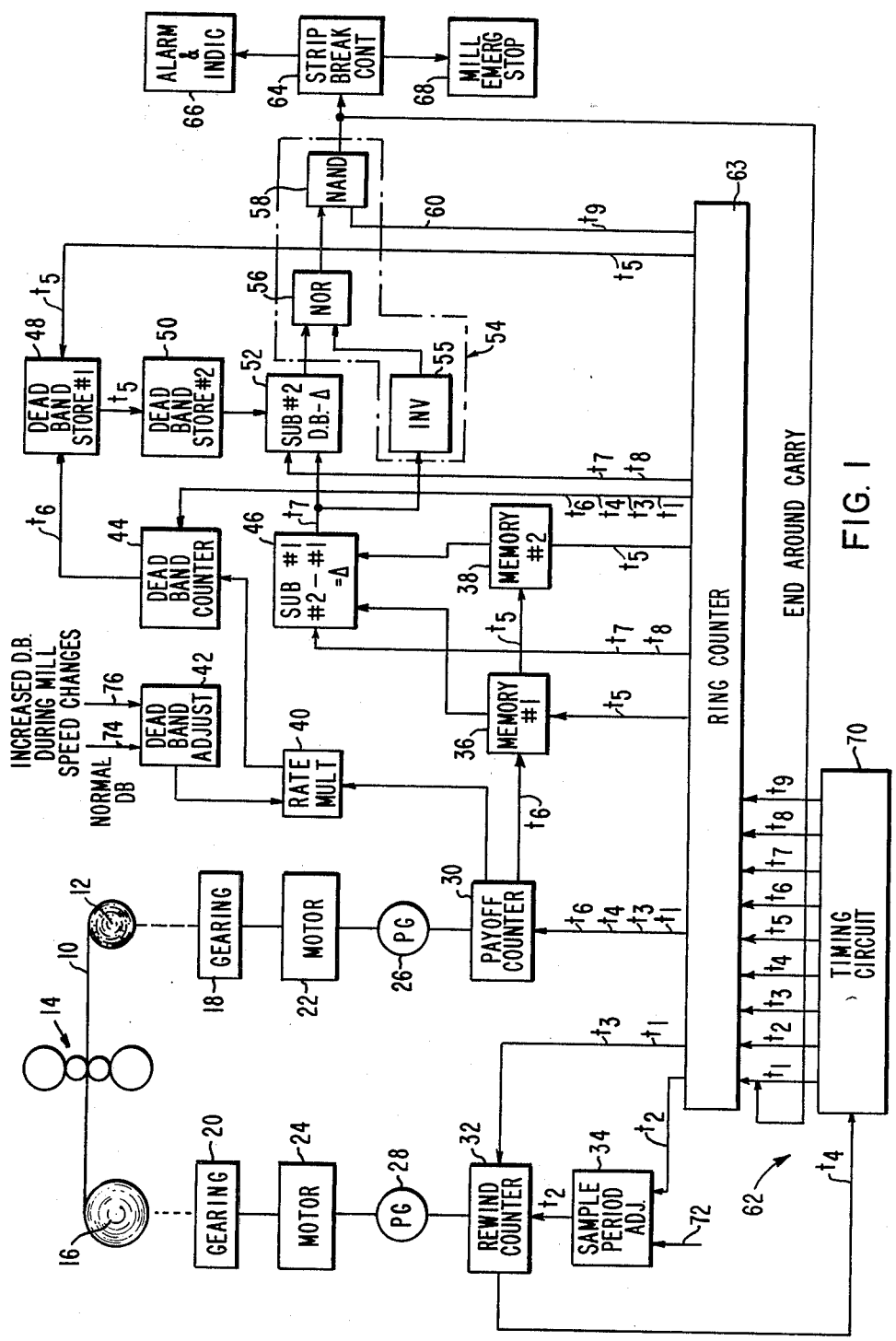
FIG. 1 is a block diagram of the strip break detection system in accordance with the invention.

Referring now to FIG. 1 a strip 10 is being payed out from a payoff reel 12 through a process line, here illustrated as a single stand mill 14, to a rewind reel 16. The payoff and rewind reels 12, 16, are respectively coupled through gearing 18, 20 to motors 22, 24. The motors 22, 24 are connected to pulse generators 26 and 28, respectively, which generate pulses as a function of motor rotational displacement. A payoff counter 30 is connected to receive the pulses from pulse generator 26. Similarly, a rewind counter 32 is connected to receive the pulses from pulse generator 28. A sample period adjustment 34 is connected to rewind counter 32. The payoff counter 30 is coupled to a memory 36, which in turn is coupled to memory 38. For convenience, these memories will be identified a memory #1 and memory #2, respectively, as indicated by the captions in FIG. 1. The payoff counter 30 is also connected to a rate multiplier 40 which is a special counter. The count of the rate multiplier 40 is controlled by dead band adjustment 42, while the output of the rate multiplier 40 is connected to a dead band counter 44.

As will be made clear as the description proceeds, the contents of memories 36 and 38 are periodically subtracted in a subtractor #1 (46), thus:

$$\text{Memory \#2} - \text{Memory \#1} = \Delta$$

The contents of the dead band counter 44 are periodically advanced, on signal, to a dead band storage 48 and a dead band storage 50. For convenience, these storage units are referred to as dead band store #1 and dead band store #2, respectively. The contents of dead band store #2 are applied to a subtractor 52 which performs the subtraction:

$$\text{Dead band (D.B.) count} - \Delta$$

For convenience, subtractors 46 and 52 are referred to as subtractor #1 and subtractor #2 respectively; the outputs of the subtractors are applied to a logic circuit indicated generally at 54. The output of subtractor 46 is applied to subtractor 52 and to an inverter 55 of logic circuit 54. The outputs of subtractor 52 and inverter 55 are applied as inputs to a logic NOR gate 56. The output of NOR gate 56 is applied as one input to logic NAND gate 58, the other input of the NAND gate 58 being signal 60.

The output of the logic NAND 58 provides a signal which is sent to a sequence controller indicated generally at 62 and to a strip break controller indicated symbolically at 64. The strip break controller 64 interprets the signal from the logic NAND gate 58, and if a break in the strip is indicated, a signal is sent simultaneously to an alarm and indicator indicated symbolically at 66 and a mill emergency stop indicated symbolically at 68. Typically, the alarm and indicator is an alarm bell circuit which is actuated to audibly sound the warning, while the indicator is a flashing light. The mill emergency stop may be any convenient means for stopping the process line such as a circuit breaker or the like.

The sequence controller 62 may be any convenient means for generating a series of sequence signals. In the embodiment here illustrated, the sequence controller 62 comprises a ring counter 63 actuated from a timing circuit further identified at 70.

The sequence controller 62 is connected to the various components of the strip break detection system to deliver the various timing signals to these members; these connections will not now be described since the arrangement will be readily apparent from the detailed explanation of the operation of the embodiment.

OPERATION OF THE PREFERRED EMBODIMENT

In describing the operation of the strip break detection system reference will be made to FIG. 2 which is a function diagram of the timing for the ring counter signals.

The strip break detection system is digital and is based on the concept that for normal mill operations, with a continuous strip of material being payed out from the payoff reel 12 to the rewind reel 16, every equal increment of rotation of the rewind reel 16 results in ever-increasing increments of rotation of the payoff reel 12.

As is well known, a pulse generator produces output pulses which are a function of the generator's rotation. Thus for example, the pulse generator 28, which is driven by motor 24, produces pulses which are a direct function of the rotational displacement of the rewind reel 16. In a similar manner, pulse generator 26 produces pulses which are a direct function of the rotational displacement of the payoff reel 12. These pulses are accumulated as counts by the counters 32 and 30, respectively.

The rewind counter 32 is set to trigger the sequence controller 62 for the entire break detection system thus establishing the sampling period during which a determination will be made as to whether or not a break has occurred in the strip 10. At 72 either by manual adjustment of an operator or by a remotely located computer, the sample period adjustment 34 is set for some number of pulse counts representing a fraction of the rotation of the rewind reel 16. Note: Once the digital sampling is set, it will remain constant, although these sampling intervals will occur over varying real time periods as a function of the speed of the rewind reel 16. Stated differently, in counting down from 10 to 0, at one time this will be accomplished in "X" milliseconds, while at another time, the 10 to 0 count may require only "Y" milliseconds. Suppose for example, the adjustment 34 is set for 10 counts representing perhaps five degrees of rotation of the rewind reel 16. The rewind counter 32 will count down from 10 to 0, and then the system will make a determination whether or not a break has occurred. Under normal processing, this process is repetitive. As the description proceeds, it will be shown how this iterative procedure is interrupted when a break occurs in the material.

The strip break detection system also includes the provision for means to desensitize the system to the point where it will not respond to sudden changes in mill draft as a result of irregularities in the entry strip or to transient conditions arising from operation of the Automatic Gain Control (AGC) of the mill. This feature is provided by rate multiplier 40 which receives the counts from the payoff counter 30, and applies a percentage of these counts, i.e., 1%, 2% or the like, to the dead band counter 44. The percentage of counts to be applied to the dead band counter 44 is adjustable by means of the dead band adjustment 42 which is connected to the rate multiplier 40. A normal dead band percentage is established at 74, manually, by the operator or by means of a computer. Provision is further provided at 76 for increasing the dead band during mill speed changes again either manually by the operator or by a remote computer for a process line which is more fully computerized. Since the dead band count per se is a finite percentage of the payoff count which is ever increasing, provision is made for updating the magnitude of the dead band count by means of dead band store #1 and dead band store #2, as will be shortly explained.

The rewind reel 16 pulls the material 10 to the left as viewed in FIG. 1, while the payoff reel 12 yielding resists and tries to pull the material to the right, thus establishing a tension in the material. When this tension is established in the material, (by means not shown) at time $t_1$ (FIGS. 1 and 2), the operator or a computer signal initiates the rolling process.

Figure 2:
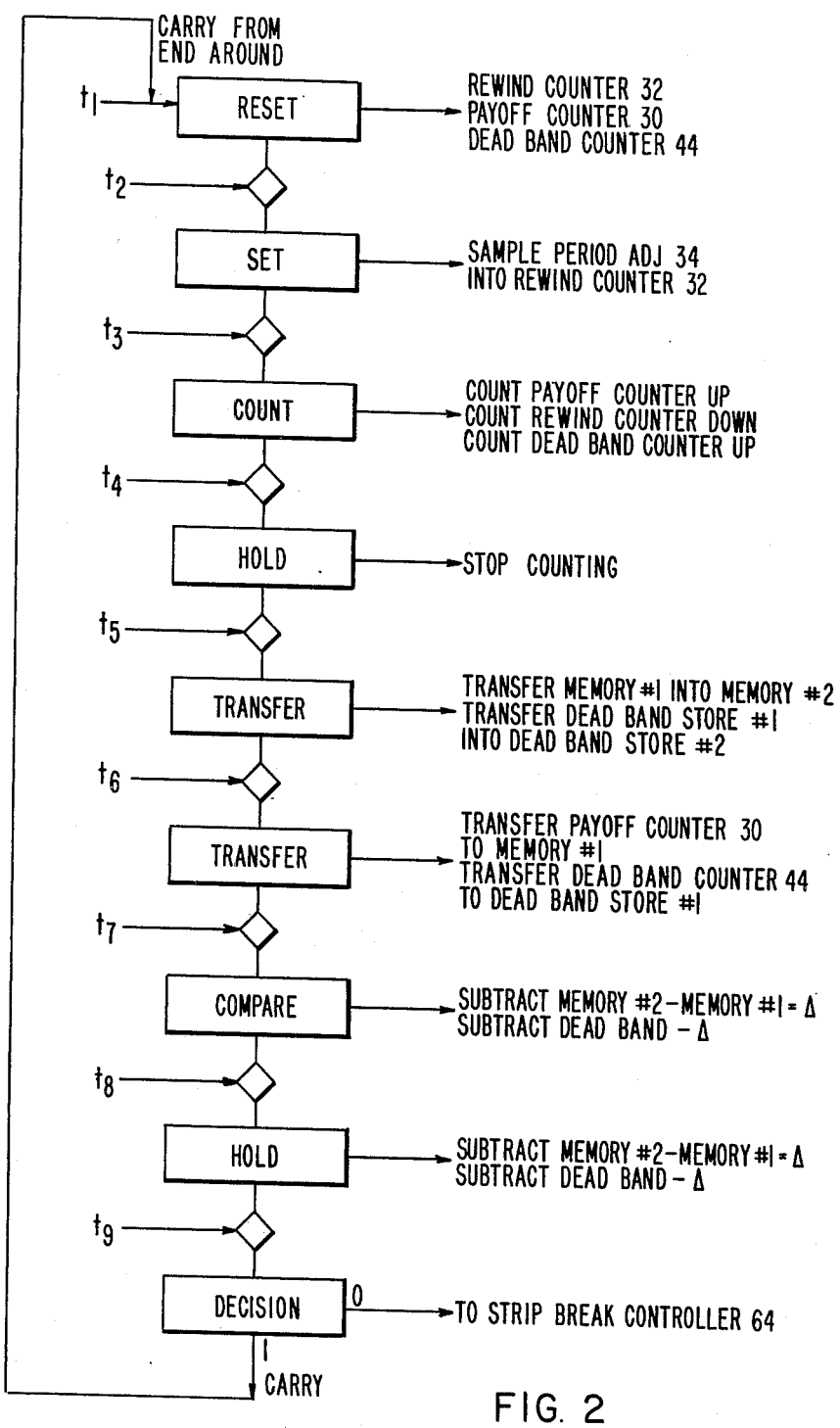
FIG. 2 is a functional block diagram of the sequence control used in the invention of FIG. 1.

As indicated in FIGS. 1 and 2 at time $t_1$ the ring counter 63 sends a signal which causes the rewind counter 32, the payoff counter 30 and the dead band counter 44 to reset. Next, at time $t_2$, an output signal from the sample period adjustment 34 is set into the rewind counter 32. At time $t_3$ the ring counter 63 sends a timing pulse and the payoff counter 30 counts UP, the rewind counter 32 counts DOWN, and the dead band counter 44 counts UP.

The counts in the payoff counter 30 are applied to memory #1 (36), and the counts in the dead band counter 44 are simultaneously being applied to dead band store #1 (48).

When rewind counter 32 counts down to zero and a signal $t_4$ is sent to the timing circuit 70 which initiates signal $t_4$ to the ring counter 62 which in turn transmits signals to the payoff and dead band counters 30, 44 to arrest further counting.

At time $t_5$, a signal is sent from the timing circuit 70 to the ring counter 63 which transmits a timing signal to transfer the memory counts in memory #1 (36) into memory #2 (38), and the counts in dead band store #1 into dead band store #2 (50). At time $t_6$, the ring counter 63 signals the payoff counter 30 to transfer its information into memory #1 (36), and the dead band counter 44 to transfer its contents into dead band store #1 (48). At time $t_7$, the ring counter 63 sends a signal to subtractor #1 (46) and to subtractor #2 (52). The subtractor #1 performs the operation:

$$\text{Memory } \#2 - \text{Memory } \#1 = \Delta$$

and the subtractor #2 performs the operation:

$$\text{Dead band (D.B.)} - \Delta$$

At time $t_8$, there is a HOLD. Essentially this means that further operation is delayed to ensure that the subtraction process is complete, i.e., no bits are lost. At time $t_9$, the ring counter 63 sends a signal (a logic ONE) to NAND gate 58 which then outputs the decision: a logic ONE indicates that everything is normal, no break has occurred, and the logic ONE is also sent to the ring counter 63 and the process is repeated. (In effect, the end around carry logic ONE becomes $t_1$).

What has happened at times $t_7$, $t_8$, is that the subtractor #1 determines whether the counts in memory #1 are greater than those in memory #2. In the normal situation this will be the case because as has been said the counts in the payoff counter 30 are continuously increasing since the strip is not broken and the diameter of the payoff reel is decreasing, and the intelligence in memory #1 is more current than that in memory #2. (Incidentally the same may be said of the dead band storages 48 and 50, i.e., the intelligence in dead band store #1 is more current than that in dead band store #2). When memory #1 is > than memory #2, the NAND gate 58 will output a logic ONE. (Subtractor #2 will still perform the operation D.B.−Δ but the logic gates inverter 54, NOR 56, and NAND 58, are arranged to ensure that a logic ONE is outputted to ring counter 63.

During some transient conditions, such as the counts in memory #2 may be greater than those in memory #1, and no break in the strip has occurred. The strip break detector system has been desensitized so that no alarm will be sent until the counts in memory #2 exceed those in memory #1 by a magnitude which is equal to or exceeds the magnitude of the dead band counts in dead band store #2 (50). In sum then, if the counts in memory #2 exceed those in memory #1 by a magnitude Δ which is less than the dead band (D.B.), subtractor #2 (52) will recognize this and send the appropriate logic signal to NOR gate 56 which will result in a logic ONE from NAND gate 58 at time $t_9$. On the other hand if Δ ≧ D.B., subtractor #2 will send the appropriate logic signal to NOR gate 56 which will result in a logic ZERO output from NAND gate 58 at $t_9$. A logic ONE indicates normal operation to the strip break controller 64, while a logic ZERO to the controller 64 initiates the alarm and indicator 66 and the mill emergency stop 68.

In order to further clarify the operation of the break detection system, some numerical examples will now be considered. The decimal counts selected for memory #1, memory #2, and the dead band have been deliberately made small so as to simplify the explanation, although it will be appreciated that these magnitudes, in most cases, will be unrealistic in a practical environment. Further, purely for convenience the counts will be represented in the natural binary code, and any other code may be utilized.

For the convenience of the reader the numbers in binary notation which we shall employ are reproduced in code in the table below:

| Decimal Notation | Binary Notation |
| --- | --- |
| 0 | 0 0 0 0 0 |
| 5 | 0 0 1 0 1 |
| 10 | 0 1 0 1 0 |
| 11 | 0 1 0 1 1 |
| 13 | 0 1 1 0 1 |
| 17 | 1 0 0 0 1 |
| 19 | 1 0 0 1 1 |
| 20 | 1 0 1 0 0 |
| 25 | 1 1 0 0 1 |
| 30 | 1 1 1 1 0 |

The negative of these numbers is obtained by taking the 1's complement of the number, i.e., $-30 = 0\,0\,0\,0\,1$.

In the normal processing situation, the counts in memory #1 are continuously increasing and therefore the count in memory #1 will be greater than the count in memory #2. A moment's reflection will reveal that this is so because memory #1 contains the latter information while memory #2 contains the information previously in memory #1.

Assume first that memory #1 represents 30 counts, memory #2 contains 13 counts, and the dead band store #2 contains 10 counts.

In the subtractor #1 (46), the operation memory #2−memory #1=Δ is performed:

| | |
| --- | --- |
| Memory #2 = 13 = | 0 1 1 0 1 |
| Memory #1 = 30 − | 0 0 0 0 1 |
| Δ − 17 | 0 1 1 1 0 |

In performing the binary subtraction above, no carry is developed, and this is a logic ZERO into the inverter 55, which then inputs a logic ONE to the NOR circuit 56. In the subtractor #2 (52), the subtraction D.B.−Δ is performed:

| | |
| --- | --- |
| D.B. = 10 = | 0 1 0 1 0 |
| Δ = −17 = | 0 1 1 1 0 |
| | 1 1 0 0 0 |

Again no carry is developed and this places a logic ZERO on the other input to NOR gate 56. With the inputs ZERO and ONE, the NOR gate sends a ZERO to NAND gate 58. At time $t_9$, a logic ONE is sent to the input of NAND gate 58, and the NAND gate 58 outputs a logic ONE which is the end around carry to the ring counter 63, and the sequence $t_1$ to $t_9$ is repeated.

In the practical environment of the invention, there are transient conditions in mill processing where there are sudden changes in mill draft as a result of irregularities in the entry strip or perhaps in the operation of the mill Automatic Gauge Control (AGC) system, which will shortly correct itself. In these transient situations, the counts in memory #2 (38) may be temporarily higher than those in memory #1 (36). Obviously, it would be disruptive rather than helpful to trigger the alarm system when this occurs. In order to desensitize the system, the dead band range is provided so that no alarm will be initiated unless the difference Δ, between memory #2 and memory #1 equals or exceeds the dead band D.B.. The following three examples will help to clarify this feature:

Suppose that count in memory #2 is greater than that in memory #1, but the difference Δ, is less than the dead band (D.B.) count. Specifically, assume memory #2=30, memory #1=25 and the dead band (D.B.) is 10.

In subtractor #1 (46) the operation is performed: memory #2−memory #1=Δ.

```
Memory #2   30    1 1 1 1 0
Memory #1  -25    0 0 1 1 0
                ┌─0 0 1 0 0
                └────→ 1
                  0 0 1 0 1  = +5 = Δ
```

The carry generated is a logic ONE which is inverted by inverter 55 to produce a logic ZERO as one input to NOR gate 56. The operation D.B.−Δ is performed in subtractor #2 (52):

```
D.B. =  10       0 1 0 1 0
Δ    =  -5       1 1 0 1 0
                ┌─0 0 1 0 0
                └────→ 1
                  0 0 1 0 1
```

The subtractor #2 (52), thus sends a logic ONE to the NOR gate 56. The NOR gate 56 now has inputs ONE, and ZERO, and it outputs a logic ZERO as one input to NAND gate 58. When the NAND gate 58 receives the logic ONE at time $t_9$, it outputs a logic ONE which is the end around carry to ring counter 63 and the sequence is repeated. Since the difference, i.e., 5 counts, is less than the dead band count 10, the alarm will not be sounded even though memory #2 is greater than memory #1.

Next, assume as our second situation, that the count of memory #2 is greater than the count of memory #1 and that the difference, Δ, is exactly equal to the dead band. Specifically, memory #2=30, memory #1=20 and the D.B.=10. The subtractor #1 (46), performs the operation memory #2−memory #1=Δ.

```
Memory #2 =    30    1 1 1 1 0
Memory #1 −   -20    0 1 0 1 1
                    ┌─0 1 0 0 1 = Δ
                    └────→ 1
                      0 1 0 1 0
```

The carry (ONE) is inverted by inverter 55, and a logic ZERO is applied to one input of NOR gate 56. The subtractor 52, performs the operation: D.B.−

```
D.B. =   10        0 1 0 1 0
Δ    =  -10        1 0 1 0 1
                   1 1 1 1 1    = 0
```

No carry is generated, and a logic ZERO is sent to NOR gate 56. The NOR gate 56 now has inputs ZERO, ZERO and it outputs a ONE. When the logic ONE is applied at time $t_9$ to NAND gate 58, it outputs a ZERO to the strip break controller 64. The alarm is then actuated, and the mill is stopped.

Finally, the last case, (and the one most likely to occur when there is a break), is where memory #2 is greater than memory #1, and the difference Δ is greater than the D.B. Assume now that memory #2 is 30, memory #1=19, and the D.B.=10. The subtractor #1 (46) performs the operation memory #2−memory #1=Δ.

```
Memory #2 =   30    1 1 1 1 0
Memory #1 =  -19    0 1 1 0 0
                   ┌─0 1 0 1 0
                   └────→ 1
                     0 1 0 1 1 = 11
```

The carry is a logic ONE to inverter 55, which then sends a logic ZERO to NOR gate 56. The subtractor #2 (52), performs the operation: D.B.−Δ.

```
D.B. =   10       0 1 0 1 0
Δ    =  -11       1 0 1 0 0
                  1 1 1 1 0     = -1
```

No carry is generated and the NOR gate 56 receives a logic ZERO. The inputs to NOR gate 56 are now ZERO, ZERO and it outputs a logic ONE. When the NAND gate 58 is enabled at time $t_9$, it outputs a logic ZERO and the alarm is initiated exactly as outlined above in the situation where Δ=D.B.

We claim:

1. A break detection system for a process line wherein strip material is being payed out from a payoff reel to a rewind reel comprising:
   means for successively digitally counting the material being payed out from the payoff reel, over first and second equal digital sampling intervals, said intervals being a function of the rotational displacement of the rewind reel;
   means for memorizing the successive digital counts to provide first and second memory counts respectively;
   means for subtracting the first memory counts from the second memory counts to provide a difference signal delta; and
   means for providing a signal indicative that a break in the strip material has occurred when delta is equal to or greater than a preselected dead-band count.

2. A break detection system for a process line wherein strip material is being payed out from a payoff reel to a rewind reel comprising: sequence timing means for providing a plurality of command signals, a rewind counter coupled to said rewind reel for counting a sampling period interval which is a function of the rotational displacement of said rewind reel, said rewind counter being connected to said sequence timing means, said rewind counter means sending an initiative signal to said sequence timing means when said sampling period interval has been counted, a pay-off counter coupled to said pay-off reel and connected to said sequence timing means, first and second memory means connected to said sequence timing means, first and second subtraction means connected to said sequence timing means, dead band counting means for providing a dead band (D.B.) count, connected to said sequence timing means, said first memory means being connected to said pay-off counter to receive the counts in said pay-off counter upon command from said sequence timing means, said second memory means being connected to said first memory means, to receive the counts therein upon command from said sequence timing means, said first subtraction means being connected to the first and second memory means and upon command from the sequence timing means to perform the subtraction: counts in memory number two minus the counts in memory number one equals the output delta (Δ), the second subtraction means being connected to the dead band counting means and to the output of said first subtraction means and upon command from the sequence timing means to perform the subtraction D.B. minus Δ, and logic circuit means connected to the first and second subtraction means for receiving the outputs Δ and D.B.−Δ, respectively, to provide a first logic signal when Δ is less than D.B., said first logic signal being sent to said sequence timing means to repeat the counting sequence, and a second logic signal, indicative that a break in the strip material has occurred, when Δ is equal to or is greater than the D.B.

3. A break detection system according to claim 2 wherein said dead band counting means comprises a rate multiplier, a dead band counter, first dead band storage means, and second dead band storage means, the rate multiplier having an input connected to the pay-off counter, and an output connected to the input of the dead band counter, the output of said rate multiplier being a percentage of the counts in the pay-off counter, the output of dead band counter being connected to the input of the first dead band storage means the input of the latter being connected to the input of the second dead band storage means, output (D.B.) of the second dead band storage means being connected to the second subtraction means, the sequence timing means being connected to the dead band counter and to the first dead band storage, and upon command, in sequence, the counts in the first dead band storage means are transferred to the second dead band storage means, and the counts in the dead band counter are then transferred to the first dead band storage means.

4. A break detection system according to claim 3 including a dead band adjustment means connected to said rate multiplier for adjusting said percentage count in response to changing requirements in the process line.

5. A break detection system according to claim 2 wherein said logic circuit means comprises an inverter, a NOR gate and a NAND gate, the inverter being connected to invert the output of the first subtraction means, and deliver the inverted output as an input to said NOR gate, the NOR gate having a second input connected to the output of the second subtraction means, the NAND gate having a first input connected to the output of the NOR gate and a second input connected to said sequence timing means, the output of the NAND gate providing said first and second logic signals.

6. A break detection system according to claim 2 including a sample period adjustment means having an adjustable output count being interposed between the rewind counter and the sequence timing means, and upon command from the sequence timing means said sample period adjustment means sends said output count to the rewind counter, the magnitude of said output count establishing said sampling period interval for said rewind counter.

7. A break detection system according to claim 2 wherein said sequence timing means comprises a ring counter, and said first logic signal is an end around carry for said ring counter.

* * * * *